(12) United States Patent
Xia et al.

(10) Patent No.: US 8,213,387 B2
(45) Date of Patent: Jul. 3, 2012

(54) METHOD, SYSTEM AND DEVICE FOR TRANSMITTING A MEDIA INDEPENDENT HANDOVER MESSAGE

(75) Inventors: Zhongqi Xia, Shenzhen (CN); Jian Zhang, Shenzhen (CN); Hongfei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 429 days.

(21) Appl. No.: 12/487,011

(22) Filed: Jun. 18, 2009

(65) Prior Publication Data

US 2009/0252121 A1 Oct. 8, 2009

Related U.S. Application Data

(63) Continuation of application No. PCT/CN2007/070909, filed on Oct. 16, 2007.

(30) Foreign Application Priority Data

Dec. 29, 2006 (CN) .......................... 2006 1 0156349

(51) Int. Cl.
*H04Q 7/00* (2006.01)
*H04J 3/16* (2006.01)
(52) U.S. Cl. ........................................ 370/331; 370/469
(58) Field of Classification Search .................. None
See application file for complete search history.

(56) References Cited

U.S. PATENT DOCUMENTS

| | | | |
|---|---|---|---|
| 2003/0014624 A1* | 1/2003 | Maturana et al. .............. | 713/151 |
| 2003/0061505 A1* | 3/2003 | Sperry et al. .................. | 713/200 |
| 2004/0081151 A1* | 4/2004 | Greis et al. ..................... | 370/392 |
| 2004/0233916 A1* | 11/2004 | Takeuchi et al. ......... | 370/395.54 |
| 2005/0044068 A1* | 2/2005 | Lin et al. ........................ | 707/3 |
| 2005/0176473 A1* | 8/2005 | Melpignano .................. | 455/574 |
| 2005/0256975 A1* | 11/2005 | Kaniz et al. ................... | 709/250 |
| 2006/0187881 A1* | 8/2006 | Kwak et al. ................... | 370/331 |
| 2006/0190719 A1* | 8/2006 | Rao et al. ....................... | 713/160 |
| 2006/0251020 A1 | 11/2006 | Olvera-Hernandez et al. | |
| 2006/0258355 A1 | 11/2006 | Olvera-Hernandez et al. | |
| 2006/0274699 A1* | 12/2006 | Faccin .......................... | 370/331 |
| 2006/0277298 A1* | 12/2006 | Kim et al. ..................... | 709/224 |

(Continued)

FOREIGN PATENT DOCUMENTS

CN 1859750 A 11/2006

(Continued)

OTHER PUBLICATIONS

Written Opinion of the International Searching Authority in corresponding PCT Application No. PCT/CN2007/070909 (Jan. 10, 2008).

(Continued)

*Primary Examiner* — Michael J Moore, Jr.
*Assistant Examiner* — Eunsook Choi
(74) *Attorney, Agent, or Firm* — Leydig, Voit & Mayer, Ltd.

(57) ABSTRACT

A method for transmitting a media independent handover (MIH) message includes the following steps: The MIH message is divided into segments and the segments are encapsulated into transmission control protocol (TCP) segments; the TCP segments are then encapsulated into Internet protocol (IP) data packets; the IP data packets is transmitted to a receiving end. The method, system, and device for transmitting an MIH message described herein provide flow controls for the MIH message transmission, thereby enhancing the transmission efficiency of the MIH message.

2 Claims, 5 Drawing Sheets

U.S. PATENT DOCUMENTS

2006/0291421 A1 12/2006 Park
2007/0291792 A1* 12/2007 Watfa et al. .............. 370/469

FOREIGN PATENT DOCUMENTS

| CN | 1881919 A | 12/2006 |
|---|---|---|
| CN | 101212393 B | 10/2010 |
| WO | WO 2007/136711 A1 | 11/2007 |

OTHER PUBLICATIONS

International Search Report in corresponding PCT Application No. PCT/CN2007/070909 (Jan. 10, 2008).

1st Office Action in corresponding Chinese Application No. 200610156349.X (Sep. 4, 2009).

Extended European Search Report in corresponding European Application No. 07817100.6 (Nov. 20, 2009).

Coft et al., "RFC 951—Bootstrap Protocol (BOOTP)," Network Working Group, Sep. 1985, The Internet Society, Reston, Virginia.

Droms, "RFC 2131—Dynamic Host Configuration Protocol," Network Working Group, Mar. 1997, The Internet Society, Reston, Virginia.

Droms, "RFC 3646—DNS Configuration options for Dynamic Host Configuration Protocol for IPv6 (DHCPv6)," Network Working Group, Dec. 2003, The Internet Society, Reston, Virginia.

Gulbrandsen et al., "RFC 2782—A DNS RR for specifying the location of services (DNS SRV)," Network Working Group, Feb. 2000, The Internet Society, Reston, Virginia.

Guttman et al., "RFC 2608—Service Location Protocol, Version 2," Network Working Group, Jun. 1999, The Internet Society, Reston, Virginia.

Lee et al., "Protocols for Service Discovery in Dynamic and Mobile Networks," International Journal of Computer Research, 2002, vol. 11, No. 1, Nova Science Publishers, Inc., Gainesville, Florida.

Lemon et al., "RFC 4361—Node-specific Client Identifiers for Dynamic Host Configuration Protocol Version Four (DHCPv4)," Network Working Group, Feb. 2006, The Internet Society, Reston, Virginia.

Mockapetris, "RFC 1034—Domain Names—Concepts and Facilities," Network Working Group, Nov. 1987, The Internet Society, Reston, Virginia.

Mockapetris, "RFC 1035—Domain Names—Implementation and Specification," Network Working Group, Nov. 1987, The Internet Society, Reston, Virginia.

Rahman et al., "Internet Draft—Transport of Media Independent Handover Messages Over IP," MIPSHOP Working Group, Jun. 9, 2006, The Internet Society, Reston, Virginia.

Thomson et al., "RFC 3596—DNS Extensions to Support IP Version 6," Network Working Group, Oct. 2003, The Internet Society, Reston, Virginia.

Wimer, "RFC 1542—Clarifications and Extensions for the Bootstrap Protocol," Network Working Group, Oct. 1993, The Internet Society, Reston, Virginia.

"IEEE P802.21/D8.0—Draft Standard for Local and Metropolitan Area Networks: Media Independent Handover Services," Dec. 2007, Institute of Electrical and Electronics Engineers, New York, New York.

Communication in corresponding European Application No. 07817100.6 (Mar. 9, 2012).

* cited by examiner

METHOD, SYSTEM AND DEVICE FOR TRANSMITTING A MEDIA INDEPENDENT HANDOVER MESSAGE

CROSS-REFERENCE TO RELATED APPLICATIONS

This application is a continuation of International Patent Application No. PCT/CN2007/070909, filed Oct. 16, 2007, which claims priority to Chinese Patent Application No. 200610156349.X, filed Dec. 29, 2006, both of which are hereby incorporated by reference in their entirety.

FIELD OF THE TECHNOLOGY

The present invention relates to the communication technology field, and more particularly, to a method, system, and device for transmitting a media independent handover (MIH) message.

BACKGROUND

With the rapid development of data communication and wireless communication technology and the appearance of a large number of mobile terminals, more and more users wish to access the Internet efficiently and flexibly without being limited by time and space. The Internet is not only supposed to provide existing data services, multimedia audio and video services, but also realize function of a mobile Internet and provide a wireless Internet access service for a mobile terminal.

As the mobile terminal needs to roam between wireless access networks or fixed networks having structures different from the wireless access networks, seamless handover between the networks becomes a necessary requirement. Media independent handover (MIH) service is an Internet protocol (IP) handover service adapted to facilitate and optimize on heterogeneous networks. The mobile terminal may only detect surrounding network state information thereof, and global information of the whole network including a neighboring cell list and the like will be revealed by a network node. Thus, to realize handover of the mobile terminal between different networks, cooperation between the mobile terminal and the network node is required. The idea of the MIH is introducing one new protocol layer, namely, an MIH layer, which is located between a data link layer and a network layer. The MIH layer provides a service support for protocols of the network layer and upper layers thereof. At the same time, the MIH layer needs to use service supports provided by protocols of the data link layer and lower layers thereof. The MIH layer may provide three types of services, namely, event services (ES), command services (CS), and information services (IS). The MIH ES provides real time transmission services for events at lower layers of the link layer or events at a remote link. The MIH CS provides command transmission services to change bottom layer link state or a connecting point. The MIH IS provides information transmission services for network topology and location related information. Messages defined based on the three services are an MIH ES message, an MIH CS message, and an MIH IS message, respectively.

The MIH message is transmitted between an MIH client and an MIH server, so as to help achieve the seamless handover for the mobile terminal. Generally speaking, the mobile terminal including an MIH service entity is the MIH client, and the network node including the MIH service entity may serve as the MIH client and the MIH server at the same time.

In a practical network deployment, the MIH service entity may exist separately, or may also coexist with other functional entities in a certain physical entity.

In the conventional art, a user-datagram protocol (UDP) and the IP are utilized for the transmission of MIH messages. FIG. 1 is a schematic view of a system for transmitting MIH messages in the conventional art. Referring to FIG. 1, the system includes an MIH client 110 and an MIH server 120. The MIH client 110 and the MIH server 120 each include an MIH service entity, a UDP transmission entity, an IP transmission entity, and an MIH timer.

A specific transmission process includes the following steps. An MIH message is generated by an MIH service entity 111 of the MIH client 110. The MIH message is sent to a UDP transmission entity 112. The UDP transmission entity 112 divides the received MIH message into a plurality of packets with the same length, encapsulates each of the packets into a UDP datagram, and sends the UDP datagrams corresponding to the packets to an IP transmission entity 113. The IP transmission entity 113 encapsulates each of the received UDP datagrams in an IP data packet, and sends out the IP data packets corresponding to the UDP datagrams. An IP transmission entity 123 of the MIH server 120 receives the IP data packets, removes an IP header of each of the IP data packets to obtain the UDP datagram, and sends the UDP datagrams corresponding to the IP data packets to a UDP transmission entity 122. The UDP transmission entity 122 removes a UDP header of each of the received UDP datagrams to obtain the packets of the MIH message, combines the packets into the MIH message, and sends the MIH message to an MIH service entity 121.

In addition, in order to ensure secure transmission, after the MIH service entity 111 of the MIH client 110 sends an MIH message, an MIH timer 114 is set for the message. After the MIH server 120 receives the MIH message, a response is made for the MIH message. The response message of the MTH message is returned to the MTH client 110, and when the response message is being returned, an MIH timer 124 also needs to be set.

When time of the MIH timer 114 of the MIH client 110 terminates, if the MIH service entity 111 of the MIH client 110 does not received the response message of the MIH server 120, the MIH message is retransmitted.

In the above-mentioned conventional solution, as the UDP is used as a bearer protocol for the MIH message, the flow control may not be realized by the UDP itself, so that the flow control function is not available for the transmission of the MIH message. In addition, in the method for transmitting the MIH message, a timer for a single MIH message is set, instead of setting a timer for a single packet of the MIH message, so that when a certain packet of the MIH message is lost, the whole MIH message has to be retransmitted, resulting in a low efficiency for the MIH message transmission.

SUMMARY

In view of the above, various embodiments of the present invention provide a method for transmitting a media independent handover (MIH) message, which is capable of implementing flow control of the MIH message transmission, and enhancing transmission efficiency of the MIH message.

Various embodiments of the present invention further provide a system and a device for transmitting an MIH message, which are capable of implementing the flow control of the MIH message transmission, and enhancing the transmission efficiency of the MIH message.

The method for transmitting an MIH message includes the following steps. The MIH message is divided into segments and each of the segments is encapsulated into a transmission control protocol (TCP) segment. Each TCP segment is encapsulated into an Internet Protocol (IP) data packet. The IP data packet is sent out.

The system for transmitting an MIH message at the same time includes a first MIH device and a second MIH device.

The first MIH device is adapted to generate the MIH message, divide the MIH message into segments and encapsulate each of the segments into a TCP segment, encapsulate each TCP segment into an IP data packet, and send the IP data packets to the second MIH device.

The second MIH device is adapted to receive the IP data packets, decapsulate the IP data packets to obtain the TCP segments, decapsulate the TCP segments to obtain the segments of the MIH message, and combine the segments of the MIH message to obtain the MIH message.

The device for transmitting an MIH message at the same time includes an MIH service entity, a TCP transmission entity, and an IP transmission entity.

The MIH service entity is adapted to generate the MIH message, send the MIH message to the TCP transmission entity, and receive the MIH message sent by the TCP transmission entity.

The TCP transmission entity is adapted to divide the MIH message into segments and encapsulate each of the segments into a TCP segment and send the TCP segments to the IP transmission entity; decapsulate each of the received TCP segments and combine the obtained segments of the MIH message to obtain the MIH message; and send the MIH message to the MIH service entity.

The IP transmission entity is adapted to encapsulate each of the TCP segments into an IP data packet and send out the IP data packets and decapsulate the received IP data packets to obtain the TCP segments and send the obtained TCP segments to the TCP transmission entity.

In the method, the system and the device for transmitting the MIH message provided according to the embodiments of the present invention, as the TCP and the IP are used to transmit the MIH message, flow control of the MIH message transmission is realized by using the flow control function of the TCP. In addition, the TCP has retransmission function, so when the MIH message is being transmitted, it is not necessary to set a timer for a single segment of the MIH message. If an error occurs in the transmission of a certain segment of the MIH message, only the segment needs to be retransmitted, instead of retransmitting the MIH message, thus enhancing the transmission efficiency of the MIH message.

DETAILED DESCRIPTION

Figure 1:
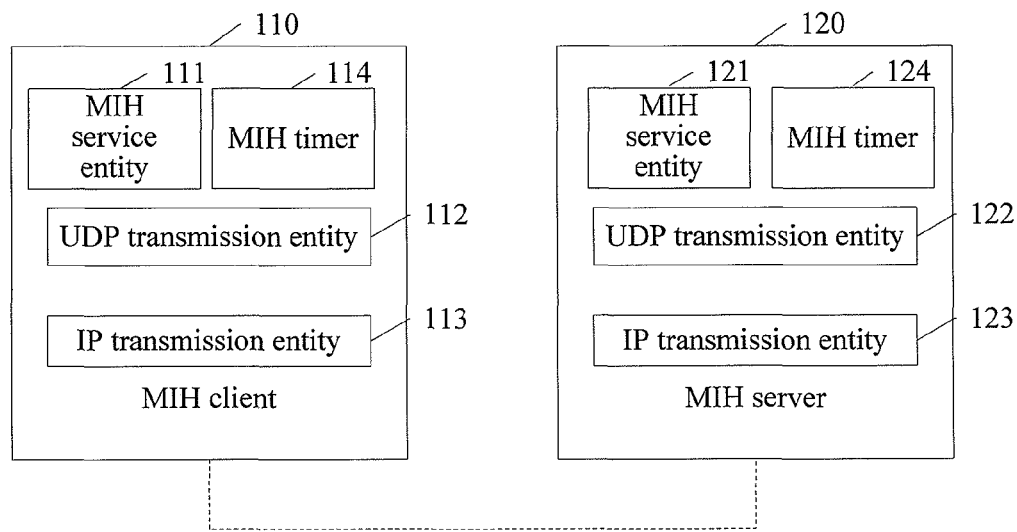
FIG. 1 is a schematic view of a system for transmitting a Media Independent Handover (MIH) message in a conventional solution.

The present invention will be illustrated in detail in the following by referring to the accompanying drawings and specific embodiments.

An embodiment of the present invention provides a method for transmitting a media independent handover (MIH) message. The method includes the following steps. At a sending end of the MIH message, the MIH message is divided into segments and each of the segments is encapsulated into a transmission control protocol (TCP) segment. Each of the TCP segments is encapsulated into an Internet protocol (IP) data packet. The IP data packets are sent out.

At a receiving end of the MIH message, the received IP data packets are decapsulated to obtain the TCP segments. The TCP segments are decapsulated to obtain the segments of the MIH message. The segments of the MIH message are combined to obtain the MIH message.

In the method, encapsulating a segment of the MIH message refers to adding a TCP header to the front of the segment of the MIH message. Decapsulating the TCP segment refers to removing the TCP header of the TCP segment.

Encapsulating the TCP segment refers to adding an IP header to the front of the TCP segment. Decapsulating the IP data packet refers to removing the IP header of the IP data packet.

The TCP is used as a bearer protocol for the MIH message, and the TCP has a flow control function, so that flow control may be realized for the transmission of the MIH message. Meanwhile, the TCP has retransmission function, so it is not necessary to set a timer for a single MIH message to realize retransmission, thus enhancing transmission efficiency of the MIH message.

Preferably, the present invention may also further use a security protocol to realize secure transmission of the MIH message. The security protocol may be an IP security (IPSec) protocol or a transport layer security (TLS) protocol.

When the IPSec protocol is further used to realize the secure transmission for the MIH message, before the MIH message is divided into segments and the segments are encapsulated into the TCP segments, the method further includes establishing a security association parameter for the sending end and the receiving end of the MIH message by using the IPSec protocol. Before the sending end sends out the IP data packets, the method further includes encrypting the IP data packets by using the security association parameter. Before the receiving end decapsulates the received IP data packets, the method further includes decrypting the IP data packets by using the security association parameter.

When the TLS protocol is further used to realize the secure transmission of the MIH message, before the MIH message is divided into segments and the segments are encapsulated into the TCP segments, the method further includes realizing mutual authentication between the sending end and the receiving end of the MIH message and establishing an encryption channel by using the TLS protocol. Before the sending end encapsulates the TCP segments into the IP data packets, the method further includes encrypting the TCP segments by using an encryption key of the encryption channel. Before the receiving end decapsulates the TCP segments, the method further includes decrypting the TCP segments by using a decryption key of the encryption channel.

For three different types of messages of the MIH, namely, an MIH information services (IS) message, an MIH event services (ES) message, and an MIH command services (CS) message, a transmission process is illustrated as follows.

Figure 2:
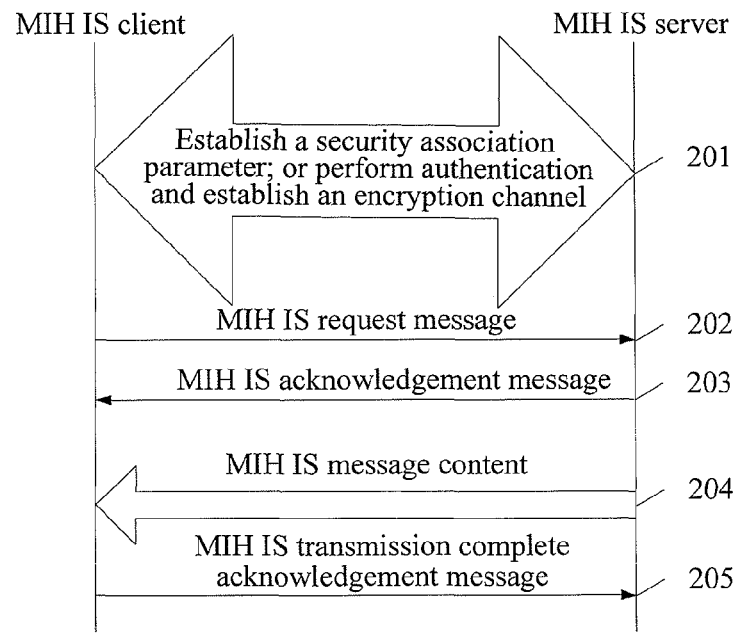
FIG. 2 is a flowchart of a method for transmitting an MIH information services (IS) message according to an embodiment of the present invention.

FIG. 2 is a flowchart of a method for transmitting a media independent handover (MIH) information services (IS) message according to an embodiment of the present invention. Referring to FIG. 2, in the method, an MIH client is an MIH IS client, and an MIH server is an MIH IS server. Steps of transmitting the MIH IS message are described in the following.

In Step 201, a security association parameter is established between the MIH IS client and the MIH IS server by using the IPSec protocol; or the mutual authentication is performed, and the encryption channel is established by using the TLS protocol.

In Step 202, the MIH IS client generates an MIH IS request message, divides the message into segments and encapsulates the MIH IS request message into the TCP segments, encapsulates the TCP segments into the IP data packets, and sends the IP data packets to the MIH IS server. In this process, the IP data packets or the TCP segments are encrypted by using the security association parameter or the encryption channel established in Step 201.

The MIH IS server removes the IP header of the received IP data packets to obtain the TCP segments, removes the TCP header of the TCP segments to obtain the segments of the MIH IS request message, and combines the segments to obtain the MIH IS request message. In this process, the IP data packets or the TCP segments are decrypted by using the security association parameter or the encryption channel established in Step 201.

In Step 203, the MIH IS server returns a corresponding MIH IS acknowledgement (Ack) message to the MIH IS client. The MIH IS Ack message includes whether the requested information is available, a size of the requested information, and features of information transmission in a next step, etc., as well as an IP address and a temporary port. The method for transmitting the MIH IS Ack message is the same as that in Step 202.

In Step 204, the MIH IS server uses the IP address and the temporary port in the MIH IS Ack message to send to the client an MIH IS message content that the client has requested. The method for transmitting the MIH IS message content is similar to Step 202, only except that the TCP segment is encapsulated by using a new IP address and temporary port.

In Step 205, the MIH IS client completes receiving the entire MIH IS message content, returns an MIH IS transmission complete Ack message to the MIH IS server. The method for transmitting the MIH IS transmission complete Ack message is different from that in Step 202.

In the above flow, the following steps may be added between Step 201 and Step 202.

Step 2011: The MIH IS client sends an MIH registration request message to the MIH IS server.

Step 2012: The MIH IS server returns the MIH registration Ack message to the MIH IS client.

Moreover, Step 203 and Step 205 are not essential steps, and may be omitted.

In the above steps, the MIH IS message content, the MIH IS request message, the MIH IS Ack message, and the MIH IS transmission complete Ack message may use the same transmission channel, that is, they are in the same socket connection, or may use different transmission channels, that is, they are in different socket connections.

Figure 3:
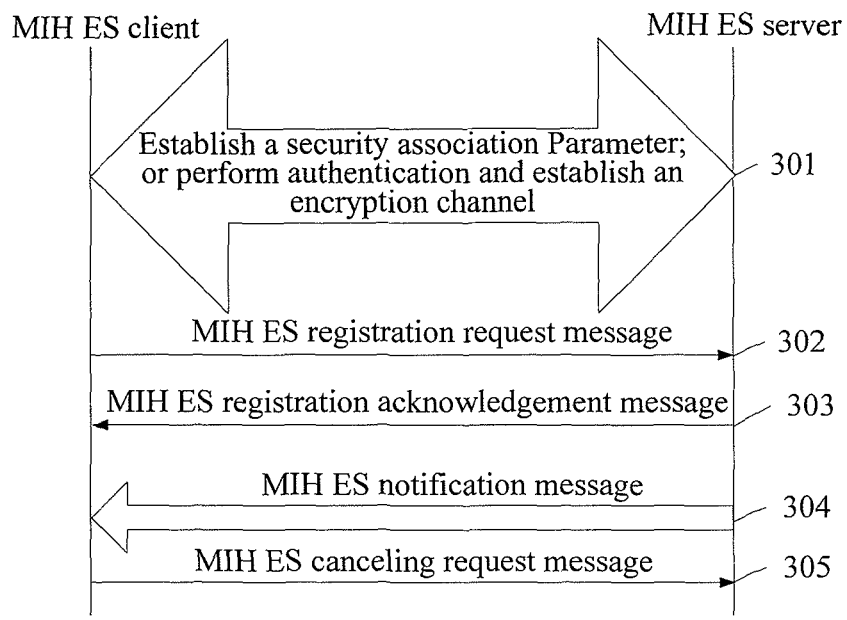
FIG. 3 is a flowchart of a method for transmitting an MIH event services (ES) message according to an embodiment of the present invention.

FIG. 3 is a flow chart of a method for transmitting an MIH ES message according to the embodiment of the present invention. Referring to FIG. 3, in the method, the MIH client is an MIH ES client, and the MIH server is an MIH ES server. Steps for transmitting the MIH ES message are illustrated in the following.

In Step 301, the security association parameter is established for the MIH ES client and the MIH ES server by using the IPSec protocol. Or, the mutual authentication is performed, and the encryption channel is established by using the TLS protocol.

In Step 302, the MIH ES client generates an MIH ES registration request message, divides the MIH ES registration request message into segments and encapsulates the segments into the TCP segments, encapsulates the TCP segments into the IP data packets, and sends the IP data packets to the MIH IS server. In this process, the IP data packets or the TCP segments are encrypted by using the security association parameter or the encryption channel established in Step 301.

The MIH ES server removes the IP header of the received IP data packets to obtain the TCP segments, removes the TCP header of the TCP segments to obtain the segments of the MIH ES registration request message, and combines the segments to obtain the MIH ES registration request message. In this process, the IP data packets or the TCP segments are decrypted by using the security association parameter or the encryption channel established in Step 301.

In Step 303, the MIH ES server verifies the MIH ES registration request message, returns an MIH ES registration Ack message including a registering result and feature coding of registering event to the MIH ES client. The method for transmitting the MIH ES registration Ack message is the same as that in Step 302.

In Step 304, the MIH ES server generates an event, and sends an MIH ES notification message to the MIH ES client. The method for transmitting the MIH ES notification message is the same as that in Step 302.

Registration of the event may be canceled with the MIH ES client leaving the MIH server, or the registration of the event may also be canceled by using Step 305.

In Step 305, the MIH ES client sends an MIH ES canceling request message to the MIH ES server. The method for transmitting the MIH ES canceling request message is the same as that in Step 302.

In the above flow, the following steps may be added between Step 301 and Step 302.

Step 3011: The MIH ES client sends the MIH registration request message to the MIH ES server.

Step 3012: The MIH ES server returns the MIH registration Ack message to the MIH ES client.

Also, Step 302 to Step 305 is only one mode of implementation; transmission directions of the messages in Step 302 to Step 305 may be changed. That is to say, the MIH ES server sends the MIH ES registration request message to the MIH ES client; the MIH ES client returns the MIH ES registration Ack message to the MIH ES server; the MIH ES client sends the MIH ES notification message to the MIH ES server; and the MIH ES server sends the MIH ES canceling request message to the MIH ES client. The modes of encapsulating and decapsulating the messages are the same as those discussed in Step 302 to Step 305.

Figure 4:
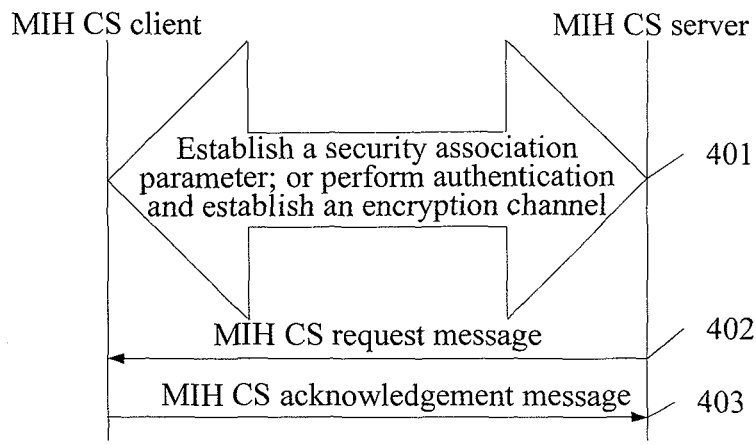
FIG. 4 is a flowchart of a method for transmitting an MIH command services (CS) message according to an embodiment of the present invention.

FIG. 4 is a flowchart of a method for transmitting an MIH CS message according to the embodiment of the present invention. Referring to FIG. 4, in the method, the MIH client is an MIH CS client, and the MIH server is an MIH CS server. Steps of transmitting the MIH CS message are illustrated in the following.

In Step 401, the security association parameter is established for the MIH CS client and the MIH CS server by using the IPSec protocol. Or, the mutual authentication is performed, and the encryption channel is established by using the TLS protocol.

In Step 402, the MIH CS server generates an MIH CS request message, divides the MIH CS request message into segments and encapsulates the segments into the TCP segments, encapsulates the TCP segments into the IP data packets, and sends the IP data packets to the MIH CS client. In this process, the IP data packets or the TCP segments are encrypted by using the security association parameter or the encryption channel established in Step 401.

The MIH CS client removes the IP header of the received IP data packets to obtain the TCP segments, removes the TCP header of the TCP segments to obtain the segments of the MIH CS request message, and combines the segments to obtain the MIH CS request message. In this process, the IP data packets or the TCP segments are decrypted by using the security association parameter or the encryption channel established in Step 401.

In Step 403, the MIH CS client receives a command, returns an MIH CS Ack message including an executing result to the MIH CS server. If a process of executing the command is relatively long, the MIH CS Ack message may be returned first, and notifies the MIH CS server of the executing result after the command has been executed. The method for transmitting the MIH CS Ack message is the same as that in Step 402.

In the above flow, the following steps may be added between Step 401 and Step 402.

Step 4011: The MIH CS client sends the MTH registration request message to the MIH CS server.

Step 4012: The MIH CS server returns the MIH registration Ack message to the MIH CS client.

Before the MIH client sends the MIH message, address information of an MIH service entity of the MIH server needs to be obtained first. The address information of the MIH service entity may be obtained in a manner of manually configuring correlations for a network node and the MIH service entity themselves, and when the MIH client is a mobile terminal, the mode that the mobile terminal obtains the address information of the MIH service entity of the MIH server is described as follows.

Figure 5:
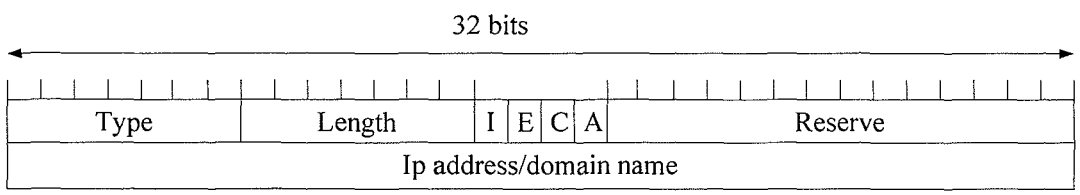
FIG. 5 is a schematic structural view of address information of an MIH service entity in a routing announcement according to an embodiment of the present invention.

If in a mobile IPv6 (MIPv6) system, the mobile terminal obtains a forwarding address at a foreign network by a stateless address automatic configuration process. Then the address information of the MIH service entity may be included in a routing announcement of a router. The router serves as one network node, which obtains the address information of the MIH service entity in the manner of manually configuring correlations. In the routing announcement, a new MIH option type may be defined. Referring to FIG. 5, a schematic structural view of the address information of the MIH service entity in the routing announcement according to the embodiment of the present invention is shown.

In FIG. 5, Type is an MIH service option; Length is a length of an MIH option; an IP address/domain name is an IP address or a domain name address of an MIH service entity that provides services; A marks whether the following address field is the IP address or the domain name address; I, E, C mark whether the server provides IS, ES, CS services; and Reserve is a reserved field. If a plurality of servers provides the MIH services, a plurality of MIH options may then be included in a route advertisement, and the Reserve field is used to represent a priority of the server.

The mobile terminal obtains the address information of the MIH service entity of the MIH server by a state address automatic configuration process in the manner of a dynamic host configuration protocol (DHCP). The address information of the MIH service entity may be included in a DHCP message. A new MIH option type may be defined in the DHCP message. The address information may be a practical IP address, or may be a domain name that supports the MIH service. In addition, a transmission protocol (for example, a user-datagram protocol (UDP) or the TCP) supported by the MIH service, and a service port intercepted by the MIH service may be included in the MIH option type. As the DHCP has two different versions supporting IPv4 protocol and IPv6 protocol respectively, a process for the mobile terminal to obtain the address information of the MIH server in the manner of a DHCP includes the following two modes.

In the first mode, the mobile terminal sends a Discovery message to a DHCP server. The DHCP server returns an offer message to the mobile terminal. The offer message carries the address information of the MIH server. The mobile terminal sends a Request message to the DHCP server to rent an IP address. The DHCP server returns an Ack message to the mobile terminal.

In the second mode, the mobile terminal sends a Discovery message to a DHCP server. The DHCP server returns an offer message to the mobile terminal. The Offer message does not carry the address information of the MIH server. The mobile terminal sends a Request message to the DHCP server, and an MIH address request is carried in the Request message. The DHCP server returns the Ack message to the mobile terminal, and the address information of the MIH server is included in the Ack message.

Figure 6:
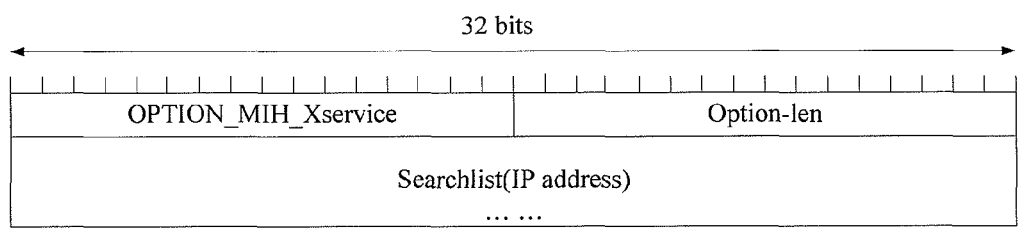
FIG. 6 is a schematic structural view of the address information of the MIH service entity in a dynamic host configuration protocol (DHCP) message according to an embodiment of the present invention.

Referring to FIG. 6, a schematic structural view of the address information of the MIH service entity in the DHCP message according to the embodiment of the present invention is shown.

In FIG. 6, OPTION_MIH_Xservice is used to identify identifiers (ID) of MIH services, including IDs of the MIH IS/ES/CS services. Option-len is used to identify a length of the MIH option. Searchlist represents a location of the MIH service entity, i.e., an IP address of the MIH service entity.

The modes for the mobile terminal to obtain the address information of the MIH service entity of the MIH server may also be obtaining the address information of the MIH service entity by a discovery method of Domain Name Service for service discovery (DNS for Service Discovery, or DNS SRV).

For the three different services of the MIH, the following records are defined in a DNS Server in a network:

```
_MIHIS._TCP TTL Class SRV Priority Weight Port Target
_MIHES._TCP TTL Class SRV Priority Weight Port Target
_MIHCS._TCP TTL Class SRV Priority Weight Port Target
```

Or, a NAME field adapted to represent an accessed domain name may be included in the records. Moreover, record using the UDP may be defined. Thus, the following exemplary records may be defined in the DNS Server:

```
_MIHIS._TCP._NAME TTL Class SRV Priority Weight Port Target
_MIHES._TCP._NAME TTL Class SRV Priority Weight Port Target
_MIHCS._TCP._NAME TTL Class SRV Priority Weight Port Target
_MIHIS._UDP._NAME TTL Class SRV Priority Weight Port Target
_MIHES._UDP._NAME TTL Class SRV Priority Weight Port Target
_MIHCS._UDP._NAME TTL Class SRV Priority Weight Port Target
```

The meaning of each field in the records is described as follows:
- MIHXX represents a service name;
- TCP/UDP represents a protocol name;
- NAME represents a domain name that is accessed;
- TTL is a standard DNS parameter, representing a valid period of the record;
- Class is a standard DNS parameter, representing a protocol type;
- SRV represents that the record is a SERVER record type;
- Priority represents a priority of the record;
- Weight represents a weight of the record;
- Port represents a port number intercepted by the service;
- Target represents a domain name of a server where the service is located.

Exemplary records using the record format are as follows:

| Service Proto Name | Class | Pri | Weight | Port | Target |
|---|---|---|---|---|---|
| _MIHIS._TCP._Example.Com. | IN SRV | 0 | 0 | 1600 | MIHIS.EXAMPLE.COM. |
| _MIHES._TCP._Example.Com. | IN SRV | 0 | 0 | 1601 | MIHES.EXAMPLE.COM. |
| _MIHCS._TCP._Example.Com. | IN SRV | 0 | 0 | 1602 | MIHCS.EXAMPLE.COM. |
| _MIHIS._UDP._Example.Com. | IN SRV | 0 | 0 | 1600 | MIHIS.EXAMPLE.COM. |
| _MIHES._UDP._Example.Com. | IN SRV | 0 | 0 | 1601 | MIHES.EXAMPLE.COM. |
| _MIHCS._UDP._Example.Com. | IN SRV | 0 | 0 | 1602 | MIHCS.EXAMPLE.COM. |

In the exemplary records, 6 SRV records are defined respectively. The 6 SRV records correspond to three services of different transmission protocols and having different interception ports. In practical implementation, three service types may be integrated into an MIH service, and the interception ports may also be integrated. In the implementation, the service name and port are only exemplary. In practical implementations, the service name and port also need to be approved by IANA.

After the mobile terminal accesses a new access domain, the mobile terminal sends an SRV query to the DNS Server. The query name (QNAME) is: _Service.Proto.Name. The mobile terminal may obtain the address information of the MIH service entity through a response of the DNS Server.

The mode for the mobile terminal to obtain the QNAME includes: (1) a static configuration mode; (2) a dynamic obtaining mode, for example, a DHCP mode; or, (3) a mode combining the two modes. For example, the service name is configured statically, an access domain name is obtained dynamically, and the QNAME is obtained in the manner of generating the QNAME by combining the two names.

The mobile terminal generates the service QNAME in different manners, and then sends a service query request to the DNS server. The DNS server receives the service query request, for example, finds a corresponding SRV record, and returns a service query response including the SRV record to the mobile terminal. The mobile terminal receives the service query response, and then obtains the domain name where the MIH service entity is located. According to this domain name, the mobile terminal sends a domain name query request to the DNS server. The DNS server receives the domain name query request to query an internal database. If a corresponding A record (IPv4 address) or AAAA record (IPv6 address) is discovered, the record result is included in a domain name query response, and the record result is the address information of the MIH service entity.

The mobile terminal may also obtain the address information of the MIH service entity during an authentication process for the mobile terminal to access a visited network.

Figure 7:
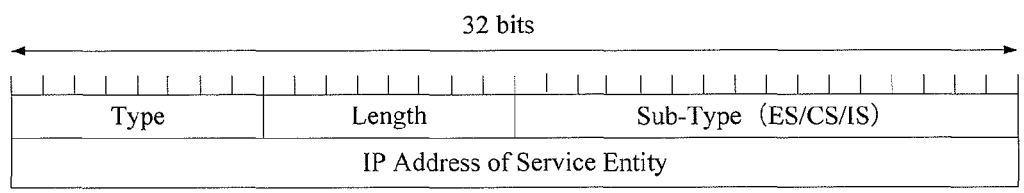
FIG. 7 is a schematic structural view of the address information of the MIH service entity in an IP control protocol (IPCP) message according to an embodiment of the present invention.

If the mobile terminal accesses a wireless network via a Point-to-Point protocol (PPP), after the mobile terminal passes link negotiation and verification, the mobile terminal enters a network negotiation stage. At this time, the mobile terminal and the visited network uses an IP control protocol (IPCP) to negotiate the network parameters. These network parameters include an IP address, a DNS address, etc. The address information of the MIH service entity may be added into an IPCP message to define a new MIH option type. Referring to FIG. 7, a schematic structural view of the address information of the MIH service entity in the IPCP message according to the embodiment of the present invention is shown.

In FIG. 7, Type is an MIH service option; Length is an option length; Sub-Type (ES/CS/IS) is a subtype of an MIH option; and IP Address of MIH Service Entity is an IP address of the MIH service entity.

Figure 8:
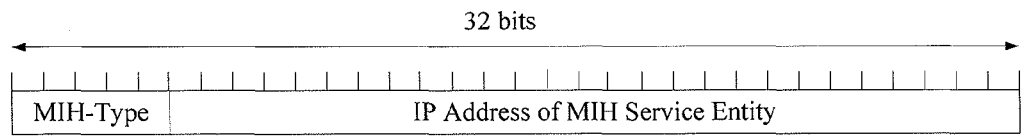
FIG. 8 is a schematic structural view of the address information of the MIH service entity in a signaling message of a Wireless Local Area Network (WLAN) according to an embodiment of the present invention.

The mobile terminal may obtain the address information of the MIH service entity in the following mode. The mobile terminal may add the address information of the MIH service entity into a wireless signaling periodically sent by the visited network, for example, into a signaling message in a wireless local area network (WLAN). Referring to FIG. 8, a schematic structural view of the address information of the MIH service entity in the signaling message of the WLAN according to the embodiment of the present invention is shown.

In FIG. 8, MIH-Type is an MIH service type, and IP Address of MIH Service Entity is an IP address of the MIH service entity.

If the visited network of the mobile terminal is a local area network (LAN), the mobile terminal may obtain the address information of the MIH service entity by application protocols such as a service location protocol (SLP). A service agent or a directory service entity exists in the network, and location information of the MIH service entity is stored in the service agent or the directory service entity. When the mobile terminal is visiting an LAN, the mobile terminal may request a location of the service agent or the directory service entity in the manner of broadcasting or multicasting. Next, the mobile terminal sends a request to the service agent or the directory service entity to obtain the address information of the MIH service entity.

A system for transmitting a media independent handover (MIH) message is provided in an embodiment of the present invention at the same time. The system includes a first MIH device and a second MIH device.

The first MIH device is adapted to generate the MIH message, divide the MIH message into segments and encapsulate the segments into transmission control protocol (TCP) segments, encapsulate the TCP segments into Internet protocol (IP) data packets, and send the IP data packets to the second MIH device.

The second MIH device is adapted to receive the IP data packets, decapsulate the IP data packets to obtain the TCP segments, decapsulate the TCP segments to obtain segments of the MIH message, and combine the segments of the MIH message to obtain the MIH message.

Figure 9:
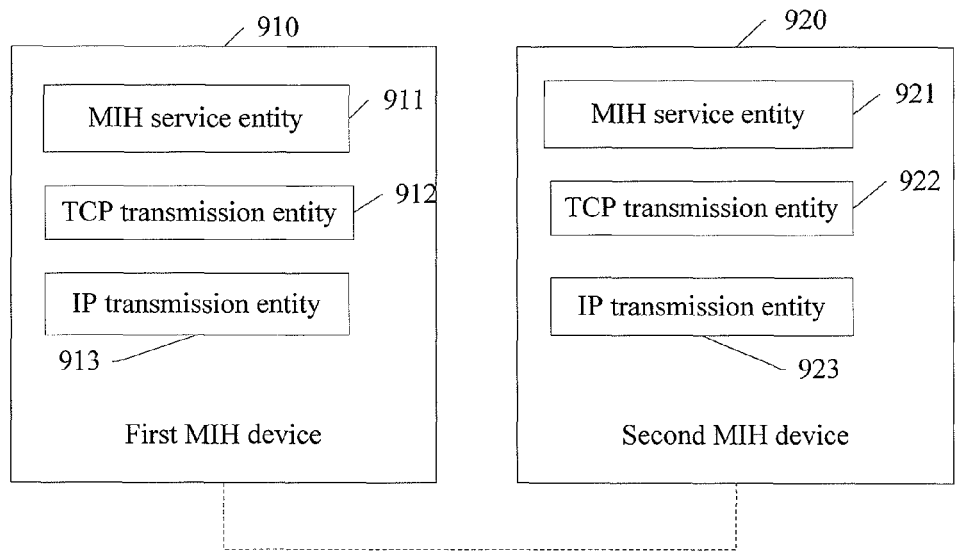
FIG. 9 is a schematic structural view of a system for transmitting an MIH message according to an embodiment of the present invention.

In the system, the first MIH device and the second MIH device each include a media independent handover (MIH) service entity, a transmission control protocol (TCP) transmission entity, and an Internet protocol (IP) transmission entity. FIG. 9 is a schematic structural view of a system for transmitting an MIH message according to an embodiment of the present invention. Referring to FIG. 9, the system includes a first MIH device 910 and a second MIH device 920.

The first MIH device 910 includes an MIH service entity 911, a TCP transmission entity 912, and an IP transmission entity 913.

The MIH service entity 911 is adapted to generate the MIH message, and send the MIH message to the TCP transmission entity 912.

The TCP transmission entity 912 is adapted to divide the received MIH message into segments, encapsulate the segments of each MIH message into TCP segments, and send the TCP segments to the IP transmission entity 913.

The IP transmission entity 913 is adapted to encapsulate the received TCP segments into IP data packets, and send the IP data packets to an IP transmission entity 923 of the second MIH device 920.

The second MIH device 920 includes an MIH service entity 921, a TCP transmission entity 922, and the IP transmission entity 923.

The IP transmission entity 923 of the second MIH device 920 is adapted to remove an IP header of the received IP data packets, and send the obtained TCP segments to the TCP transmission entity 922.

The TCP transmission entity 922 is adapted to remove a TCP header of the received TCP segments, combine the obtained segments of the MIH message to obtain the MIH message, and send the MIH message to the MIH service entity 921.

The MIH service entity 921 is adapted to receive the MIH message sent by the TCP transmission entity 922.

Preferably, in the system, the first MIH device is further adapted to establish a security association parameter between the second MIH device, and encrypt the IP data packets by using the security association parameter.

The second MIH device is further adapted to establish the security association parameter between the first MIH device, and decrypt the IP data packets by using the security association parameter.

Figure 10:
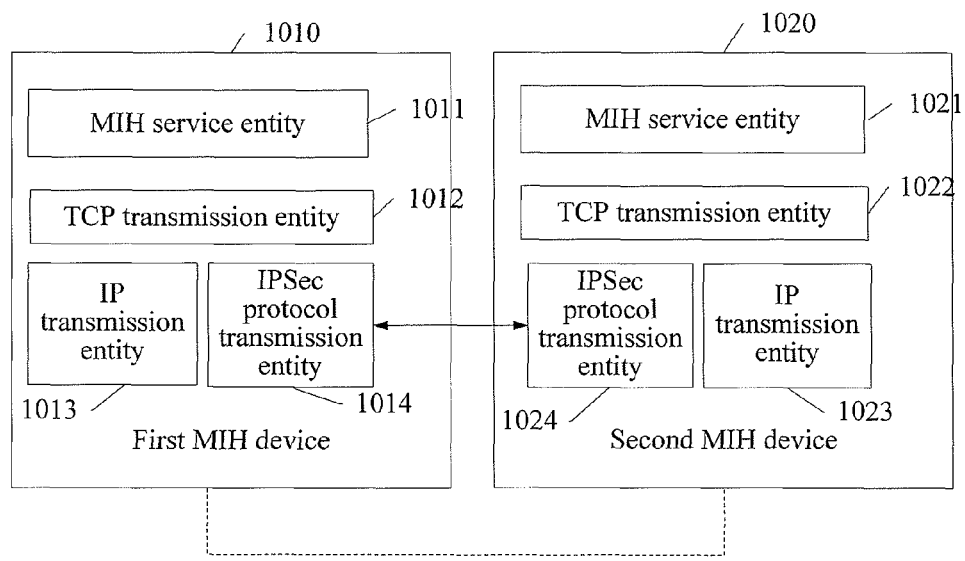
FIG. 10 is a schematic structural view of a first preferred embodiment of a system for transmitting an MIH message according to the present invention.

The first MIH device and the second MIH device may further each include an IP security (IPSec) protocol transmission entity. FIG. 10 is a schematic structural view of a first preferred embodiment of a system for transmitting an MIH message according to the present invention. Referring to FIG. 10, the system includes a first MIH device 1010 and a second MIH device 1020. The first MIH device 1010 and the second MIH device 1020 each include an MIH service entity, a TCP transmission entity, an IP transmission entity, and an IPSec protocol transmission entity. The IP transmission entity and the IPSec protocol transmission entity are at the same network hierarchy, i.e., a network layer.

Before the MIH message is transmitted, a security association parameter is established between an IPSec protocol transmission entity 1014 of the first MIH device 1010 and an IPSec protocol transmission entity 1024 of the second MIH device 1020. Before an IP transmission entity 1013 of the first MIH device 1010 sends an IP data packet, the IPSec protocol transmission entity 1014 encrypts the IP data packet by using the security association parameter. After an IP transmission entity 1023 of the second MIH device 1020 receives the IP data packet, the IPSec protocol transmission entity 1024 decrypts the IP data packet by using the security association parameter.

Preferably, in the system, the first MIH device is further adapted to perform mutual authentication and establish an encryption channel between the second MIH device, and encrypt a TCP segment by using the encryption channel;

The second MIH device is further adapted to perform the mutual authentication and establish the encryption channel between the first MIH device, and decrypt the TCP segment by using the encryption channel.

Figure 11:
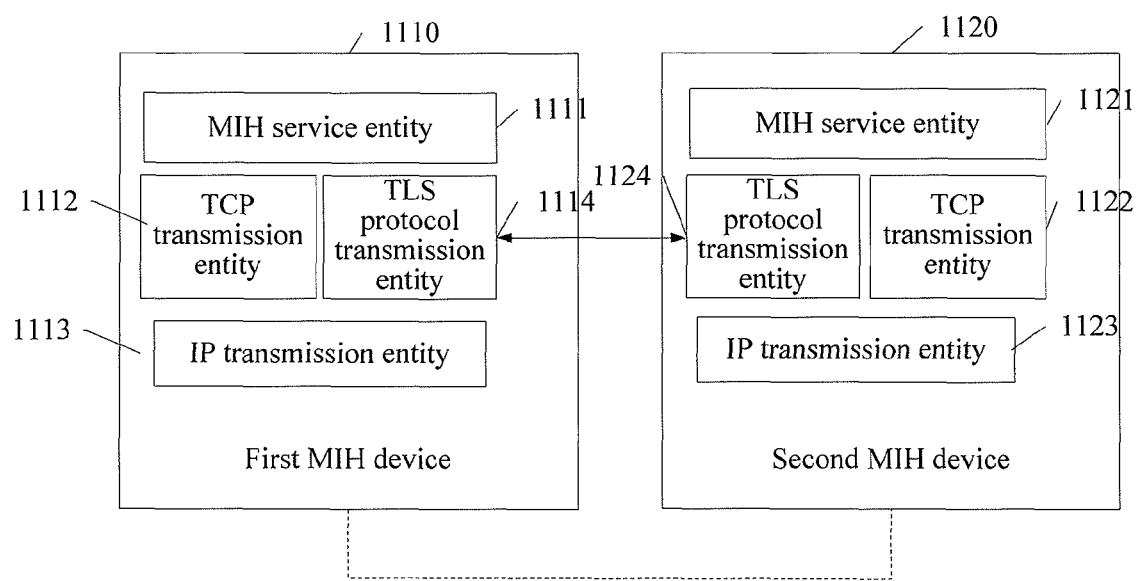
FIG. 11 is a schematic structural view of a second preferred embodiment of a system for transmitting an MIH message according to the present invention.

The first MIH device and the second MIH device may further each include a transport layer security (TLS) protocol transmission entity. FIG. 11 is a schematic structural view of a second preferred embodiment of a system for transmitting an MIH message according to the present invention. Referring to FIG. 11, the system includes a first MIH device 1110 and a second MIH device 1120. The first MIH device 1110 and the second MIH device 1120 each include an MIH service entity, a TCP transmission entity, an IP transmission entity, and a TLS protocol transmission entity. The TCP transmission entity and the protocol transmission entity are at the same network hierarchy, i.e., a transport layer.

Before the MIH message is transmitted, mutual authentication is performed and an encryption channel is established between a TLS protocol transmission entity 1114 of the first MIH device 1110 and a TLS protocol transmission entity 1124 of the second MIH device 1120. Before a TCP transmission entity 1112 of the first MIH device 1110 sends a TCP segment, the TLS protocol transmission entity 1114 encrypts the TCP segment by using an encryption key of the encryption channel. After a TCP transmission entity 1122 of the second MIH device 1120 receives the TCP segment, the TLS protocol transmission entity 1124 decrypts the TCP segment by using a decryption key of the encryption channel.

Figure 12:
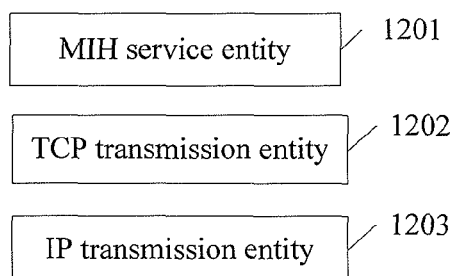
FIG. 12 is a schematic structural view of a device for transmitting an MIH message according to an embodiment of the present invention.

A device for transmitting a Media Independent Handover (MIH) message is provided in an embodiment of the present invention at the same time. FIG. 12 is a schematic structural view of the device for transmitting the MIH message according to the embodiment of the present invention. Referring to FIG. 12, the device includes an MIH service entity 1201, a TCP transmission entity 1202, and an IP transmission entity 1203.

When the device for transmitting the MIH message sends the MIH message, the functions of the entities are described as follows.

The MIH service entity 1201 is adapted to generate the MIH message, and send the MIH message to the TCP transmission entity 1202.

The TCP transmission entity 1202 is adapted to divide the MIH message into segments and encapsulate the segments into TCP segments, and send the TCP segments to the IP transmission entity 1203.

The IP transmission entity 1203 is adapted to encapsulate the received TCP segments into IP data packets and send the IP data packets to another device for transmitting the MIH message.

When the device for transmitting the MIH message receives the MIH message, the functions of the entities are described as follows.

The IP transmission entity 1203 is adapted to decapsulate the received IP data packets to obtain TCP segments, and send the obtained TCP segments to the TCP transmission entity 1202.

The TCP transmission entity 1202 is adapted to decapsulate the received TCP segments to obtain segments of the MIH message, combine the obtained segments of the MIH message to obtain the MIH message, and send the MIH message to the MIH service entity 1201.

The MIH service entity 1201 is adapted to receive the MIH message sent by the TCP transmission entity 1202.

Preferably, the device for transmitting the MIH message according to the present invention further includes an IPSec protocol transmission entity. The IPSec protocol transmission entity and the IP transmission entity are at the same network hierarchy, i.e., a network layer.

Before the MIH message is transmitted, a security association parameter is established for the IPSec protocol transmission entities between the devices for transmitting the MIH message. The IPSec protocol transmission entity encrypts the IP data packet sent by the IP transmission entity, and decrypts the IP data packet received by the IP transmission entity by using the security association parameter.

Or the device for transmitting the MIH message according to the present invention further includes a TLS protocol transmission entity. The TLS protocol transmission entity and the TCP transmission entity are at the same network hierarchy, i.e., a transport layer.

Before the MIH message is transmitted, mutual authentication is realized and an encryption channel is established for the TLS protocol transmission entities between the devices for transmitting the MIH message. The TLS protocol transmission entity encrypts the TCP segments sent by the TCP transmission entity by using an encryption key of the encryption channel, decrypts the TCP segments received by the TCP transmission entity by using a decryption key of the encryption channel.

It is clear that for the method, the system and the device adapted to transmit the MIH message provided in embodiments of the present invention, the MIH message is transmitted by using a TCP and an IP. As the TCP has flow control function, so that flow control may be realized for transmission of the MIH message according to the present invention. As error control function of the TCP is used, a timer does not need to be set for the MIH message during the transmission of the MIH message according to the present invention. When errors occur to transmission of a segment of one MIH message, only the segment needs to be retransmitted instead of retransmitting the MIH message. Thus, the transmission efficiency of the MIH message is enhanced. In addition, as a security transmission protocol is used, for example, an IPSec protocol and a TLS protocol, secure transmission of the MIH message may be ensured. At the same time, the present invention also provides a method for a mobile terminal to obtain the address information of the MIH service entity before the MIH service is transmitted.

What is claimed is:

1. A method for transmitting a media independent handover (MIH) message, comprising:
   obtaining the address information of an MIH service entity;
   dividing the MIH message into segments;
   encapsulating the segments into transmission control protocol (TCP) segments at a sending end;
   encapsulating the TCP segments into Internet protocol (IP) data packets at the sending end; and
   sending out the IP data packets at the sending end;
   wherein the obtaining the address information of the MIH service entity comprises:
   defining an address record of the MIH service entity in a domain name service (DNS) server;
   obtaining, by an entity sending the IP data packet, a query name (QNAME);
   sending, by the entity sending the IP data packet, a query request to the DNS Server; and
   returning, by the DNS Server, the address information of the MIH service entity to the entity sending the IP data packet;
   wherein the QNAME is obtained through one of the following modes:
   a static configuration mode;
   a dynamic obtaining mode; and
   a mode configuring a service name and a protocol name in the QNAME statically, obtaining an access domain name in the QNAME dynamically, and generating the QNAME by concatenating the service name, the protocol name, and the access domain name.

2. A device for transmitting a media independent handover (MIH) message, comprising:
   an MIH service entity adapted to generate and send the MIH message;
   a transmission control protocol (TCP) transmission entity adapted to receive the MIH message, divide the MIH message into segments, encapsulate the segments into TCP segments, and send the TCP segments; and
   an internet protocol (IP) transmission entity adapted to receive the TCP segments, encapsulate the TCP segments into IP data packets, and transmit the IP data packets;
   wherein the device further comprises:
   a module for obtaining address information of the MIH service entity;
   wherein the module for obtaining address information of the MIH service entity comprises:
   a sub-module for obtaining a query name (QNAME);
   a sub-module for sending a query request to a domain name service (DNS) server, in which an address record of the MIH service entity is defined;
   a sub-module for receiving the address information of the MIH service entity returned from the DNS Server;
   wherein the QNAME is obtained through one of the following modes:
   a static configuration mode;
   a dynamic obtaining mode; and
   a mode configuring a service name and a protocol name in the QNAME statically, obtaining an access domain name in the QNAME dynamically, and generating the QNAME by concatenating the service name, the protocol name, and the access domain name.

* * * * *